Patented Sept. 24, 1946

2,408,094

UNITED STATES PATENT OFFICE 2,408,094

PROCESS

Albert A. Pavlic, Claymont, Del., assignor to E. I. du Pont de Nemours & Company, Wilmington, Del., a corporation of Delaware No Drawing. Application November 11, 1943, Serial No. 509,896

10 Claims. (Cl. 260—455)

This invention relates to a process for converting organic halides into thiols.

Various methods are known for converting halides to thiols. For example, the organic halide may be treated with sodium hydrosulfide, whereby the halogen atom is replaced by a thiol group. Methods such as this are not always satisfactory because of the alkalinity of the agent employed, which has a detrimental effect on alkali-sensitive reactants and reaction products.

An object of this invention is to provide a process for converting organic halides to thiols. A further object is the preparation of acetylthio substituted organic compound and particularly bis(acetylthio) carboxylic acids and their esters. Another object is to provide such a process wherein the use of strong alkali is avoided. Other objects will appear hereinafter.

These objects are accomplished by the process of this invention, which comprises reacting an organic halide wherein the halogen is attached to singly-bonded, non-aromatic carbon, with thiolacetic acid in the presence of an amine, and hydrolyzing the acetylthioester thus obtained.

The process may be represented by the following equations:

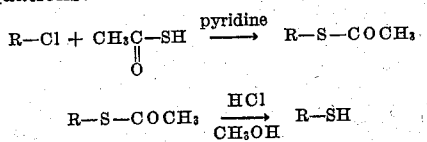

The more detailed practice of the invention is illustrated by the following examples, wherein parts given are by weight. There are, of course, many forms of the invention other than these specific embodiments.

Example I

This example illustrates the preparation of 2,3-dimercaptopropionic acid from methyl 3-acetylthio-2-chloropropionate,

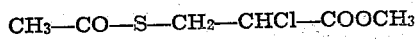

A mixture of 590 parts of methyl 3-acetylthio-2-chloropropionate (prepared as described below) and 500 parts of pyridine is cooled to 5° C. To the vigorously stirred mixture is added, in the course of four hours, 275 parts of thiolacetic acid, the temperature being maintained below 15° C. by external cooling. After standing at room temperature for about 16 hours, the resulting slurry is cooled to —15° C. and rapidly stirred while 360 parts of concentrated hydrochloric acid is added dropwise to neutralize the pyridine. During this addition it is convenient to add also about 100 parts of water to facilitate stirring. The oil which separates is extracted with three successive portions of 200 parts of ether, the ether extract is washed once with 10% hydrochloric acid, twice with water, then dried over anhydrous sodium sulfate. Distillation of the ether leaves a residue of 720 parts of crude methyl 2,3-bis(acetylthio) propionate.

The crude product is hydrolyzed without further purification by dissolving it in 2,800 parts of methanol containing 1% of anhydrous hydrogen chloride and allowing the solution to stand 48 hours at room temperature. Approximately four-fifths of the solvent is then removed by distillation and an additional 800 parts of a 1% solution of hydrogen chloride in methanol is added to insure complete hydrolysis of the acetylthio groups. The remaining methanol and methyl acetate are removed by distillation at reduced pressure, leaving a residue of 520 parts of crude methyl 2,3-dimercaptopropionate. By fractional distillation there is isolated 265 parts of pure methyl 2,3-dimercaptopropionate (yield: 58% of the theory), which boils at 40° C. at 0.2 mm. or at 54° C. at 0.5 mm. Its refractive index $N_D^{25}$ is 1.5251, and its specific gravity $d_4^{25}$ is 1.2294.

Analyses:

Calculated for $C_4H_8O_2S_2$: C, 31.6%; H, 5.4%; S, 42.1%; thiol sulfur, 42.1%.

Found: C, 32.4%; H, 5.4%; S, 42.2%; thiol sulfur, 42.0%.

The free 2,3-dimercaptopropionic acid can be obtained from its methyl ester as follows: A mixture of 59 parts of the ester with 650 parts of 1% aqueous hydrochloric acid is refluxed for eight hours (it is homogeneous after four hours). The hydrolysis mixture is then extracted with four 70-part portions of ether. After drying the ether extract over anhydrous calcium sulfate and distilling off the ether, there is obtained a solid residue of 2,3-dimercaptopropionic acid, which is recrystallized from chloroform. The yield is 45 parts, or 83% of the theoretical. 2,3-dimercaptopropionic acid is a white crystalline solid melting at 74—74.5° C. It is soluble in water to the extent of about 8%.

Analyses:

Calculated for $C_3H_6O_2S_2$: C, 26.1%; H, 4.4%; S, 46.4%; thiol sulfur, 46.4%; neutralization equivalent, 138.

Found: C, 26.0%; H, 4.7%; S, 45.7%; thiol sulfur, 46.1%; neutralization equivalent, 139.

The methyl 3-acetylthio-2-chloropropionate used above may be prepared by allowing a mixture of 90 parts of methyl alpha-chloroacrylate and 57 parts of thiolacetic acid to react at room temperature for 24 hours. Distillation under reduced pressure yields 103 parts (yield: 84% of the theoretical) of pure methyl 3-acetylthio-2-chloropropionate, boiling at 72° C. at 1 mm. pressure and having a refractive index $N_D^{25} = 1.4893$.

In essentially the same manner, 10,11-dimercaptoundecanoic acid can be obtained from 10,11-dibromoundecanoic acid by treatment with thiolacetic acid and pyridine followed by acid hydrolysis. 10,11-dimercaptoundecanoic acid is a liquid boiling at 166–167° C. at 0.2 mm. pressure.

Analyses:

Calculated for $C_{11}H_{22}O_2S_2$: thiol sulfur, 25.6%; neutralization equivalent, 250.

Found: Thiol sulfur, 25.2%; neutralization equivalent, 249.

*Example II*

This example illustrates the preparation of 3,4-dimercaptotetrahydrothiophene-1-dioxide from the corresponding dibromo compound.

Two hundred and seventy-eight parts of 3,4-dibromotetrahydrothiophene-1-dioxide (obtained by reacting butadiene with sulfur dioxide and brominating the resulting 2,5-dihydrothiophene-1-dioxide) is mixed with 400 parts of pyridine. The mixture is cooled to −20° C. and treated gradually with 250 parts of thiolacetic acid. During this addition, and for four hours afterward, the temperature is maintained below −10° C. After allowing the reaction mixture to stand for 16 hours at +5° C., it is poured into 425 parts of concentrated hydrochloric acid, previously cooled to −30° C. The resulting paste is washed with water by decantation and dried under reduced pressure. The crude product is recrystallized from methanol, which gives 49 parts of pure 3,4-bis(acetylthio)tetrahydrothiophene-1-dioxide in the form of white needles melting at 155–156° C.

Analyses:

Calculated for $C_8H_{12}O_4S_3$: C, 35.8%; H, 4.5%; S, 35.8%.

Found: C, 35.6%; H, 4.4%; S, 35.2%.

The ester is hydrolyzed to the corresponding thiol by warming with a 1% solution of hydrogen chloride in methanol for four hours. On cooling, the hydrolysis product separates out. After recrystallization from methanol, there is obtained 32 parts (yield: 95% of the theory) of 3,4-dimercaptotetrahydrothiophene-1-dioxide in the form of water-insoluble, white crystals, melting at 126–128° C.

Analyses:

Calculated for $C_4H_8O_2S_4$: C, 26.1%; H, 4.4%; S, 52.2%; thiol sulfur, 34.8%.

Found: C, 26.4%; H, 4.6%; S, 49.7%; thio sulfur, 33.1%.

The process of this invention is generically applicable to any organic halide in which the halogen has an atomic weight above 20 and is attached to only singly-bonded non-aromatic, preferably aliphatic carbon, and in which any carbon atom bears only one halogen atom. For example, it is applicable to alkyl halides or alkylene dihalides, e. g., methyl chloride, ethyl bromide, butyl bromide, dodecyl chloride, hexadecyl iodide, ethylene dichloride, hexamethylene dibromide; aralkyl halides, e. g., benzyl bromide; aralkylene halides, e. g., p-xylylene bromide; cycloalkyl halides, e. g., cyclohexyl chloride, etc.

It is applicable to those heterocyclic halogen compounds where the halogen is attached to non-aromatic (Bernthsen, page 545; Whitmore, page 874) carbon, e. g., the dibromotetrahydrothiophene-1-dioxide of Example II.

The particular utility of the process resides in the fact that it may successfully be applied to alkali-sensitive materials such as halogen-containing esters, aldehydes, acetals, ketones, etc., or halogen-containing cyclic sulfones such as that of Example II with minimum risk of dehydrohalogenation or hydrolysis. A special field of application of the process is in the preparation of vicinal dimercaptocarboxylic acids, their esters and their salts. These compounds can be readily prepared by the method described herein. Examples of vicinal dimercaptocarboxylic acids are 2,3-dimercaptopropionic acid, 2,3-dimercaptobutyric acid, 4,5-dimercaptovaleric acid, 5,6-dimercaptocaproic acid, 10,11-dimercaptoundecanoic acid, 9,10-dimercaptostearic acid, 9,10-dimercaptoricinoleic acid, etc.

In the reaction of thiolacetic acid with organic halides, any amine is satisfactory for use as an acid acceptor, such as, for example, aniline, the toluidines, butylamine, decylamine, pyridine, piperidine, N-dimethylaniline, N-diethylaniline, trimethylamine, triethylamine, etc. Of these, the tertiary amines are the preferred class. Other thiolcarboxylic acids may be used instead of thiolacetic acid, such as thiolpropionic, thiolbutyric, thiolbenzoic acids, etc., but there is no advantage in using these more expensive materials since the thiolcarboxylic acid is consumed during the reaction.

The above description and examples are intended to be illustrative only. Any modification of or variation therefrom which conforms to the spirit of the invention is intended to be included within the scope of the claims.

What is claimed is:

1. A process which comprises reacting thiolacetic acid in the presence of an amine with an organic halogen compound having a halogen of atomic weight of at least 20 attached to only singly-bonded, non-aromatic carbon.

2. A process which comprises reacting thiolacetic acid in the presence of a tertiary amine with an organic halogen compound having a halogen of atomic weight of at least 20 attached to only singly-bonded, aliphatic carbon.

3. A process which comprises reacting thiolacetic acid in the presence of a tertiary amine with an organic halogen compound having two halogens of atomic weight of at least 20 attached to two vicinal only singly-bonded, aliphatic carbons.

4. A process which comprises reacting thiolacetic acid in the presence of pyridine with methyl 3-acetylthio-2-chloropropionate.

5. A process which comprises reacting thiolacetic acid in the presence of an amine with an organic halogen compound having a halogen of atomic weight of at least 20 attached to only singly-bonded, non-aromatic carbon, and hydrolyzing the acetylthio compound thus prepared to the corresponding thiol.

6. A process which comprises reacting thiolacetic acid in the presence of a tertiary amine with an organic halogen compound having a halogen of atomic weight of at least 20 attached to only singly-bonded, aliphatic carbon, and hydrolyzing the acetylthio compound thus prepared to the corresponding thiol.

7. A process which comprises reacting thiolacetic acid in the presence of a tertiary amine with an organic halogen compound having two halogens of atomic weight of at least 20 attached to two vicinal only singly-bonded, aliphatic carbons, and hydrolyzing the acetylthio compound thus prepared to the corresponding dithiol.

8. A process which comprises reacting thiolacetic acid in the presence of pyridine with methyl 3-acetylthio-2-chloropropionate, and hydrolyzing the acetylthio compound thus prepared to the corresponding dithiol.

9. A process which comprises reacting thiolacetic acid in the presence of a tertiary amine with 3,4-dibromotetrahydrothiophene-1-dioxide and hydrolyzing the acetylthio compound thus prepared to 3,4-dimercaptotetrahydrothiophene-1-dioxide.

10. A process which comprises reacting thiolacetic acid in the presence of a tertiary amine with 10,11-dibromoundecanoic acid and hydrolyzing the acetylthio compound thus prepared to 10,11-dimercaptoundecanoic acid.

ALBERT A. PAVLIC.